United States Patent [19]

Lindén

[11] Patent Number: 4,884,608
[45] Date of Patent: Dec. 5, 1989

[54] SPIKE FITTED ON A VEHICLE TIRE FOR PERPENDICULAR CONTACT WITH THE ROAD

[75] Inventor: Unto Lindén, Hämeelinna, Finland

[73] Assignee: Neste Oy, Finland

[21] Appl. No.: 187,536

[22] PCT Filed: Sep. 18, 1987

[86] PCT No.: PCT/FI87/00123
§ 371 Date: Apr. 15, 1988
§ 102(e) Date: Apr. 15, 1988

[87] PCT Pub. No.: WO88/01945
PCT Pub. Date: Mar. 24, 1988

[30] Foreign Application Priority Data

Sep. 19, 1986 [FI] Finland ................................. 863801

[51] Int. Cl.⁴ ............................................. B60C 11/14
[52] U.S. Cl. ..................................... 152/210; 152/211
[58] Field of Search ............................... 152/210, 211

[56] References Cited

U.S. PATENT DOCUMENTS 3,842,880 10/1974 Keinanen ........................... 152/210

FOREIGN PATENT DOCUMENTS 59-202912 11/1984 Japan .
524487 8/1972 Switzerland .

OTHER PUBLICATIONS

Patent Abstracts of Japan, vol. 9, No. 7, (M-367), abstract of JP 59-202912, Publ. 11/16/84.

Primary Examiner—David Simmons
Assistant Examiner—Michele K. Yoder
Attorney, Agent, or Firm—Steinberg & Raskin

[57] ABSTRACT

The present invention concerns a fixed spike, or a sleeve-mounted spike, fitted on a vehicle tire. The fixed spike or the sleeve-mounted spike, features an asymmetric region which is disposed to produce a force component ($F_2$) turning the fixed spike, or the sleeve-mounted spike (20) so that the fixed spike, or the sleeve-mounted spike (20) is arranged, at initial contact with the road surface (17), to meet the road surface (17) substantially in vertical position.

9 Claims, 1 Drawing Sheet

SPIKE FITTED ON A VEHICLE TIRE FOR PERPENDICULAR CONTACT WITH THE ROAD

BACKGROUND OF THE INVENTION

The present invention concerns a fixed spike on a sleevemounted spike, fitted on a vehicle tyre.

Increasing traffice load and spike tyres in combination have proven to be a remarkable road attrition factor. In some countries this has even led to prohibition of spike tyres, or at least to considerable restrictions.

In Nordic conditions, the beneficial effect of anti-slip means on the safety and flexibility of traffice has on the other hand been irrefutably demonstrated, and this effect should not be sacrificed: instead, the associated drawbcks should be eliminated. Good results will be achieved by further developing both the road superstructures and the anti-slip tyres.

As a pneumatic automobile tyre rolls on an even surface, it is considerably flattened radially, owing to its flexibility, whereby in the contact region longitudinal as well as transversal forces are generated owing to changes of the rolling radius.

The longitudinal forces acting on the spike when the tyre is rolling are due to bending of the body structure, to longitudinal slipping and to the stress wave in the rubber.

When a spike approaches the point of contact with the road, the tyre body undergoes bending such that the radius of the bent part is significally smaller than that of equivalent parts of the load-free tyre. This deflects the spike, which has been mounted at right angles against the surface, to assume a vertical position before contact with the road. Owing to the protrusion of the spike point, however, the spike is not turned into sufficiently upright position: it meets the road surface in an oblique position. At this stage, he forces due to slipping tendency also begin to exert their influence. As the rotating tyre surface and the protruding body (the spike) attached thereto meet the road surface, a dynamically caused impact against the road surface is produced. The attrition of the road can be significantly reduced if said impact can be eliminated or reduced.

The impact has been found to be due to the kinetic energy of the spike, in other words, due to the mass of the spike and its velocity in the direction against the road surface. The effective mass is influenced by the spike mass itself and, in addition, by a friction force, its magnitude depending, in its turn, on the spike design in that the friction of a spike body mounted in a sleeve results from sliding between the sleeve and the metallic body, while the friction force of a fixed spike is active between the spike body and the rubber. The mass of a fixed spike is influenced, owing to its shaping, partly also by the mass of the surrounding rubber.

Prior designs have not eliminated the abrasion effect from the dynamic impact in any other way than by reducing the mass of the spike, and it is believed that the practical minimum limit has already been reached in this respect. As taught by the new invention, certain design features are suggested for the spike and the tyre with the express aim to reduce the dynamic initial contact peak and the ultimate scratch.

Traditionally, the shape of the spike has been symmetric and it has been mounted in a hole, perpendicualr against the wear surface of the tyre, whereby it meets the road in a slightly oblique position as the forces mentioned affect its position. The oblique contact of the spike with the road, as well as its being pushed deeper into the tyre in oblique position during the initial part of road contact, cause damage to the rubber and to the spike which impairs the friction properties of the spike, detracts from the durability of the spike and increases its road attrition properties.

SUMMARY OF THE INVENTION

The aim of the invention is to achieve an improvement in currently known fixed spike designs on sleeve-mounted spike designs. The more specific aim of the invention is to provide a fixed spike, on a sleeve-mounted spike, in which the drawbacks troubling designs of prior art have been avoided.

The aims of the invention are achieved by means of a fixed spike, on a sleeve-mounted spike, which is mainly characterized in that the fixed spike, on the sleeve-mounted spike features an asymmetric region which has been disposed to produce a force component turning the fixed spike on the sleeve mounted spike, in such manner that the fixed spike, on the sleeve-mounted spike has been arranged to meet the road surface, at initial contact with the road surface, in a position which is substantially perpendicular. Accordingly, the present invention is directed to a fixed spike or a sleeve-mounted spike, fitted on a vehicle tire, characterized in that the fixed or sleeve-mounted spike has an asymmetric region disposed to produce a force component ($F_2$) turning the fixed spike (10) or the sleeve-mounted spike (20) so that the fixed spike (10) or the sleeve-mounted spike (20) is arranged, at initial contact with the road surface (17), to meet the road surface (17) in a substantially perpendicular position.

Other characteristic features of the fixed spike, on sleeve-mounted spike of the invention are presented below.

As taught by the invention, the dynamic impact force is reduced by exerting an effect on the spike just before the onset of road contact in that its movement is stopped by directing a lifting force component thereon. In addition, the road contact is made less abrasive on the road when the spike is lifted to a more nearly vertical position in relation to the road surface; the more upright position of the spike also reduces the scratching wear in the terminal part of the road contact area and increases the durability of the spike in the tyre.

When an asymmetric spike is mounted in a conventional spike hole, it becomes already positioned at installation so that its road contact will take place with the spike in a position which is substantially more upright against the road surface than that of an equivalen symmetric spike. By designing the configuration of the asymmetric beak and of the region generating the counterforce, and by the extent to which the spike projects, the position of the spike at the moment immediately before road contact is adjusted to be optimal.

BRIEF DESCRIPTION OF THE DRAWINGS

The invention is described in the following in more detail by referring to some advantageous embodiments of the invention, presented in the figures of the drawing attached, yet to which the invention is not meant to be exclusively confined.

DESCRIPTION OF THE PREFERRED EMBODIMENTS

Figure 1:
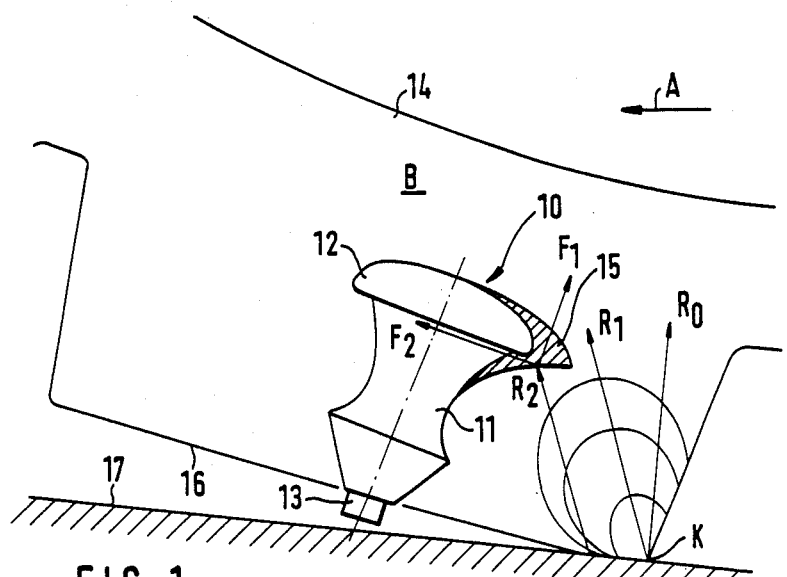
FIG. 1 presents an advantageous embodiment of the fixed spike of the invention.

In FIG. 1 the fixed spike of the invention in general is indicated by reference numeral 10. The fixed spike 10 is composed of a body part 11, a flange part 12 and a point 13. The rubber of the vehicle tyre is indicated by reference numeral 14, and the wear surface of the tyre by reference numeral 16.

As described by the basic idea of the invention, the fixed spike 10 is made asymmetric. In the present embodiment, asymmetry has been implemented by designing the flange 12 to be asymmetric on one maragin 15. The asymmetric part 15 need not necessarily occur on the flange 12: a similar asymmetric part 15 may also be provided on the body part 11. In the most advantageous embodiment, the asymmetric part 15 constitutes a kind of beak disposed to take up the resultant of the road contact force, indicated in FIG. 1 by arrows $R_O$—$R_2$. In FIG. 1, the driving direction is indicated by arrow A and the road surface, by reference numeral 17.

Figure 2:
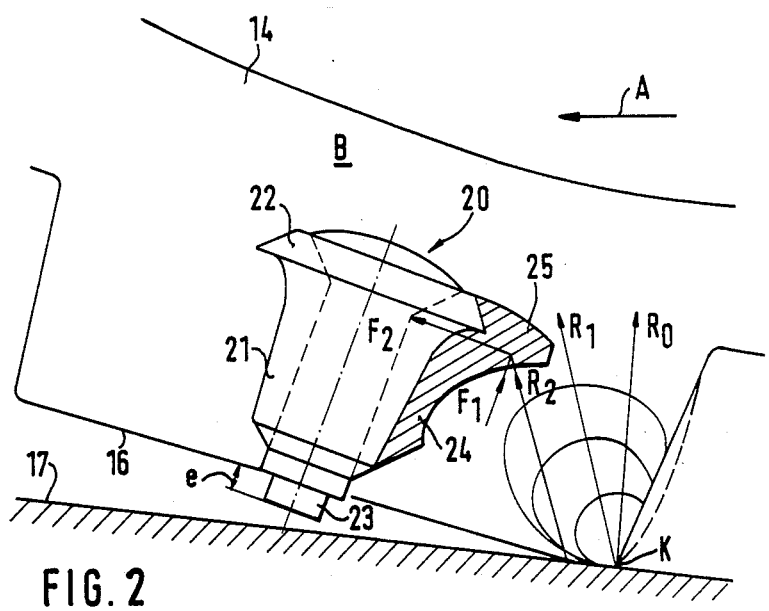
FIG. 2 presents an advantageous embodiment of the sleeve-mounted spike of the invention.

In the embodiment of FIG. 2, the sleeve-mounted spike of the invention in general is indicated by reference numeral 20. The sleeve-mounted spike 20 has a rivet 21, a flange 22 on the rivet 21, a point 23 and a sleeve 24. The protrusion of the spike from the wear surface 16 is indicated by e.

As taught by the basic idea of the invention, the sleeve 24 is provided with an asymmetric region 25 disposed to take up the resultant $R_O$—$R_2$ of the road contact force in a way similar to that in the embodiment of FIG. 1. In this embodiment, the asymmetric region is provided on the sleeve at a height which is substantially consistent with the location of the flange 22 of the ribet 21. The asymmetric region 25 is a claw-like region. The asymmetric region 25 may, of course, equally be located slightly higher on the sleeve (i.e. deeper into the tire rubber 14, thata is, similarly as in the embodiment of FIG. 1, in other words, in the sleeve region at the height corresponding to the upper part of the rivet 21. The other reference numerals correspond to those in the embodiment of FIG. 1.

When the spike of the invention is installed in the hole, the spike causes a static stress region in the surrounding rubber. When the stress wave caused by compression of the tyre meets the stress region of thes ppike asymmetrically, and exceeds it, the spike turns owing to the compressed state of the rubber. At the same time, the spike is influenced by forces arising from the rotation of the tyre. The situation is illustrated by FIGS. 1 and 2.

In a static situaation and at low speeds, the pressure effect originating from the contact angle K of the rubber is uniform and its resultant $R_O$ is very closes to vertical. The rear margin of the rubber pieces bulges out rearwardly and the contact surface, 16 forwardly against the road 17. With higher spped, the pressure resultant turns forward in the direction $R_1$, and the pressure pattern becomes more pronouncedly oval. The pressure resultant is also turned forward because in the region B the pressure in the rubber is lower since no compression force is present there. Owing to the rotation of the tyre and the compression of the rubber, the pressure resultant also moves forward to the point $R_2$, whereby it encounters the spike flange and impaarts to it an upward acceleration, with the component $F_1$, and at the same time turns it from the position as installed to a position more nearly perpendicular against the road surfce, with the component $F_2$. The spike is enabled to turn because there is no compression forward of it. It is possible to influence the utilization of said forces by the mode of installing the spike and by its shape features. A shaped structure also creates on the side where said pressure resultants act, a wider local pressure region on which the pressure resultant from the compressed rubber exerts an even more powerful effect. In other words, the asymmetric region 15, 25 is at the same time disposed to produce a force component $F_1$ lifting the fixed spike 10 or the sleeve-mounted spike 20, whereby the velocity, due to rotation of the tire, at which the spike and the road meet has at the same time been arranged to be substantially reduced.

I claim:

1. A spike fitted on a vehicle tire comprising a hole for said spike substantially perpendicular to a wear surface, said spike comprising an asymmetric region positioned thereon to cause a static stress region in surrounding rubber of said tire which, when a stress wave caused by compression of said tire rubber meets said asymmetric static stress region, generates a force component ($F_2$) during tire rotation upon driving which acts to turn said spike to a position substantially perpendicular to a surface on which the tire is being driven, whereby said spike is oriented prior to initial contact with the surface, to meet the surface at said initial contact in said substantially perpendicular position.

2. The spike of claim 1, which is a fixed spike.

3. The spike of claim 1, wherein said spike is a sleeve-mounted spike.

4. The spike of claim 2, additionally comprising a flange thereon which comprises at least part of said asymmetric region.

5. The spike of claim 2, additionally comprising a body portion thereof, said body portion comprising at least part of said asymmetric region.

6. The spike of claim 3, additionally comprising a sleeve, a rivet mounted in said sleeve, and a flange on said rivet, with said sleeve comprising said asymmetric region at a location corresponding to said flange of said rivet.

7. The spike of claim 3, additionally comprising a sleeve, a rivet mounted in said sleeve, and a flange on said rivet, with said sleeve comprising said asymmetric region at a location substantially at an area of an upper part of said rivet.

8. The spike of claim 9, wherein said asymmetric region is additionally positioned to generate a force component ($F_1$) lifting said spike, whereby velocity, due to rotation of the tire, at which said spike and the surface meet, is substantially reduced.

9. The spike of claim 2, additionally comprising, in the following order, a flange, a body portion, and a point for protruding in the tire, with said body portion comprising said asymmetric region.

* * * * *